(12) United States Patent
Watters et al.

(10) Patent No.: US 9,875,591 B2
(45) Date of Patent: Jan. 23, 2018

(54) SYSTEMS AND METHODS FOR PHONE-AS-A-KEY RANGE EXTENSION

(71) Applicant: Ford Global Technologies, LLC, Dearborn, MI (US)

(72) Inventors: Brock Watters, Livonia, MI (US); Doug B. Thornburg, Dearborn, MI (US)

(73) Assignee: Ford Global Techologies, LLC, Dearborn, MI (US)

( * ) Notice: Subject to any disclaimer, the term of this patent is extended or adjusted under 35 U.S.C. 154(b) by 0 days.

(21) Appl. No.: 15/138,703

(22) Filed: Apr. 26, 2016

(65) Prior Publication Data

US 2017/0309098 A1    Oct. 26, 2017

(51) Int. Cl.
| | |
|---|---|
| *G05B 19/00* | (2006.01) |
| *G07C 9/00* | (2006.01) |
| *H04B 1/3822* | (2015.01) |
| *H04W 4/02* | (2009.01) |
| *H04W 4/00* | (2009.01) |

(52) U.S. Cl.
CPC ....... *G07C 9/00309* (2013.01); *H04B 1/3822* (2013.01); *H04W 4/008* (2013.01); *H04W 4/025* (2013.01); *G07C 2009/00769* (2013.01)

(58) Field of Classification Search
CPC ..... B60R 25/24; B60R 25/40; G07C 9/00309; G07C 2009/0038; G07C 2009/00365; G07C 2009/00373
USPC ...... 340/5.2, 5.28, 5.6, 5.61–5.64, 5.7, 5.72, 340/5.8–5.81, 10.34, 426.36
See application file for complete search history.

(56) References Cited

U.S. PATENT DOCUMENTS

| | | | |
|---|---|---|---|
| 6,236,333 B1 | 5/2001 | King | |
| 7,046,119 B2 | 5/2006 | Ghabra et al. | |
| 7,574,619 B2* | 8/2009 | Senda | G06F 1/32 709/233 |
| 7,629,876 B2* | 12/2009 | Nagai | B60R 25/24 340/426.13 |
| 7,689,198 B2* | 3/2010 | Deng | G11B 19/027 340/426.16 |
| 8,319,605 B2* | 11/2012 | Hassan | G01C 17/38 340/10.2 |
| 8,706,350 B2 | 4/2014 | Talty et al. | |

(Continued)

FOREIGN PATENT DOCUMENTS

WO    WO 2015/084852 A2    6/2015

OTHER PUBLICATIONS

Search Report dated Sep. 1, 2017, for GB Patent Application No. GB1706579.8 (4 Pages).

*Primary Examiner* — Carlos E Garcia
(74) *Attorney, Agent, or Firm* — James P. Muraff; Neal, Gerber & Eisenberg LLP

(57) ABSTRACT

Systems and methods for phone-as-a-key range extension are disclosed. An example disclosed vehicle includes an integrated antenna array with a plurality of antenna located on a roof of the vehicle. The plurality of antenna includes a personal area network antenna. The example vehicle also includes a personal area network module communicatively connected to the personal area network antenna. Additionally, the vehicle includes a key phone unit communicatively connected to the personal area network module. The example key phone unit performs key fob functions as requested by an authorized mobile device.

16 Claims, 3 Drawing Sheets

(56) References Cited

U.S. PATENT DOCUMENTS

| | | |
|---|---|---|
| 2005/0190039 A1 | 9/2005 | Aoyama |
| 2013/0099892 A1* | 4/2013 | Tucker ............... G07C 9/00309 340/5.61 |
| 2014/0240091 A1* | 8/2014 | Talty .................. G07C 9/00309 340/5.62 |
| 2015/0028995 A1* | 1/2015 | Gautama ............... B60R 25/406 340/5.72 |
| 2015/0054639 A1* | 2/2015 | Rosen ................. G06K 9/00785 340/439 |
| 2015/0077253 A1* | 3/2015 | Spahl ................. G07C 9/00182 340/568.1 |
| 2015/0191150 A1 | 7/2015 | Van Wiemeersch |

\* cited by examiner

SYSTEMS AND METHODS FOR PHONE-AS-A-KEY RANGE EXTENSION

TECHNICAL FIELD

The present disclosure generally relates to remotely controlling subsystems of a vehicle and, more specifically, systems and method for phone-as-a-key range extension.

BACKGROUND

Phone-as-a-key (PAAK) technology facilitates accessing functions traditionally associated with a key fob via an app executing on a smart phone. The smart phone executing the PAAK app communicates with vehicles via a wireless network. However, the vehicles, such as cars and trucks, are often parked in areas with poor electromagnetic characteristics that block or attenuate communication between a phone and the vehicle. Additionally, other devices that share the frequency band in the vicinity of the vehicle can cause interference. Both poor electromagnetic characteristics and interference on the frequency band can shorten the operable range of the PAAK features.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments for phone-as-a-key range extension are disclosed. An example disclosed vehicle includes an integrated antenna array with a plurality of antenna located on a roof of the vehicle. The plurality of antenna includes a personal area network antenna. The example vehicle also includes a personal area network module communicatively connected to the personal area network antenna. Additionally, the vehicle includes a key phone unit communicatively connected to the personal area network module. The example key phone unit performs key fob functions as requested by an authorized mobile device.

A example method includes detecting a location of the mobile device via an integrated antenna array on a roof of the vehicle that include a plurality of antenna and a first personal area network module communicatively connected to the personal area network antenna. The example plurality of antenna included a personal area network antenna. Additionally, the example method includes, in response to the mobile device being authorized to communicate with the vehicle, performing key fob functions requested by the mobile device.

A example method includes detecting a location of the mobile device via an integrated antenna array on a roof of the vehicle that include a plurality of antenna and a first personal area network module communicatively connected to the personal area network antenna. The example plurality of antenna included a personal area network antenna. Additionally, the example method includes, in response to the mobile device being authorized to communicate with the vehicle, performing key fob functions requested by the mobile device

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
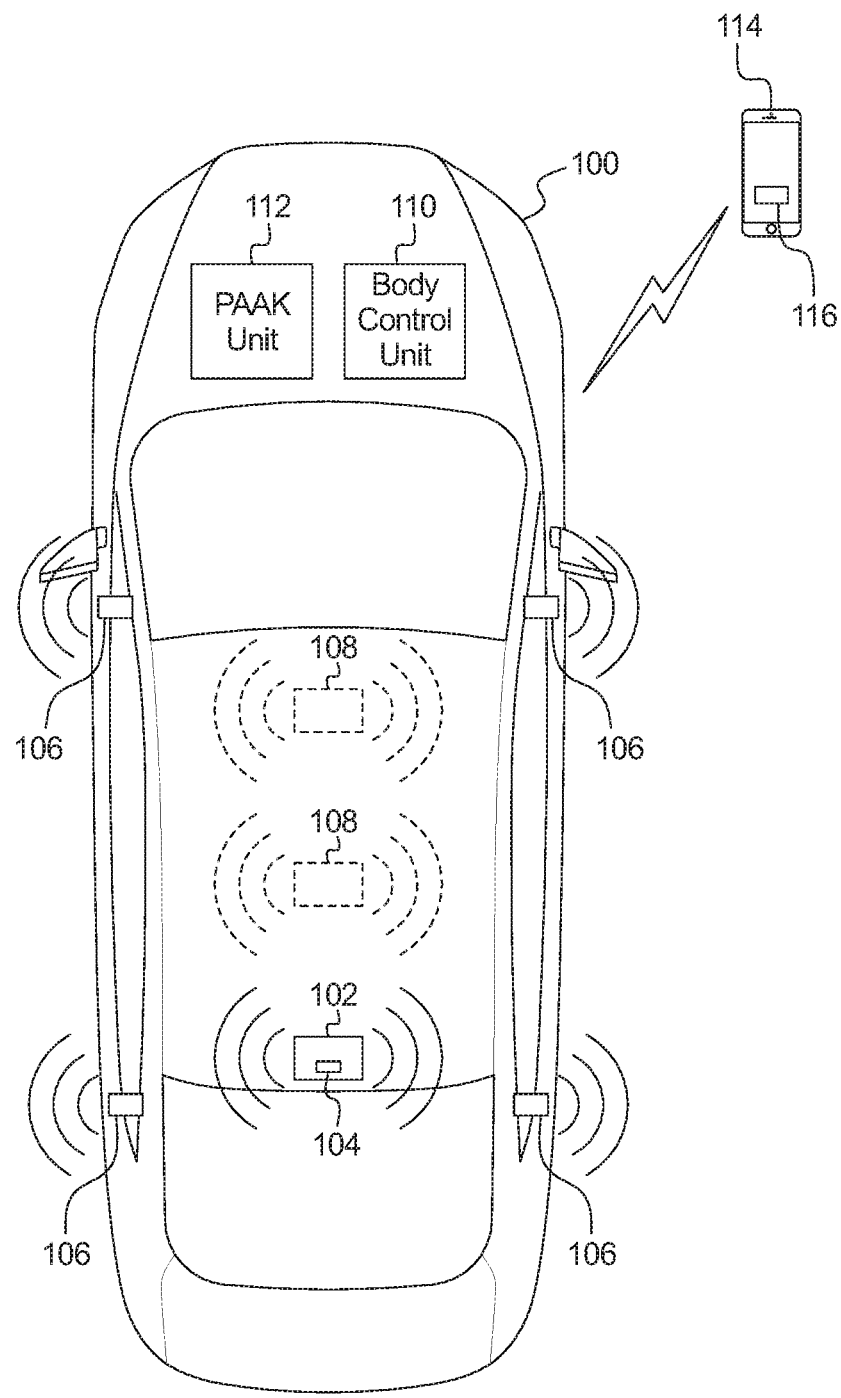
FIG. 1 illustrates a vehicle with an integrated antenna module for extending the range of phone-as-a-key functions according to the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

FIG. 1 illustrates a vehicle 100 with an integrated antenna module 102 for extending the range of phone-as-a-key functions according to the teachings of this disclosure. The vehicle 100 may be a standard gasoline powered vehicle, a hybrid vehicle, an electric vehicle, a fuel cell vehicle, or any other mobility implement type of vehicle. The vehicle 100 may be non-autonomous, semi-autonomous, or autonomous. The vehicle 100 includes parts related to mobility, such as a powertrain with an engine, a transmission, a suspension, a driveshaft, and/or wheels, etc. In the illustrated example, the vehicle 100 includes the integrated antenna module 102, an elevated wireless network node 104, a plurality of external wireless network nodes 106, one or more internal wireless network nodes 108, a body control unit 110, and a phone-as-a-key (PAAK) unit 112.

The integrated antenna module 102 is located on the roof of the vehicle 100. The integrated antenna module 102 incorporates antenna for radio-based controllers installed in the vehicle 100. As discussed in connection with FIG. 2 below, the integrated antenna module 102 may include an antenna for a wireless local area network controller (e.g., wireless local area network based on IEEE 802.11 a/b/g/n/ac or others, etc.), an antenna for a global positioning system (GPS) receiver, an antenna for a standards-based (e.g., cellular) controller (e.g., e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.), a satellite radio antenna, and/or an antenna for a dedicated short range communication (DSRC) controller, etc.

The integrated antenna module 102 includes the elevated wireless network node 104. The elevated wireless network node 104 that connects with a mobile device 114 (e.g., a smart phone, a tablet, a smart watch, etc.) executing a PAAK app 116. In some examples, elevated wireless network node 104 operates as a personal area network (e.g., Bluetooth®, Zigbee®, etc.). In some such examples, the elevated wireless network node 104 operates as a Bluetooth® Low Energy (BLE) node. The BLE protocol is set forth in Volume 6 of the Bluetooth Specification 4.0 (and subsequent revisions) maintained by the Bluetooth Special Interest Group. The elevated wireless network node 104 has an elevated position to improve its line-of-sight with the mobile device 114. Additionally, because the integrated antenna module 102 is on the roof of the vehicle 100, the elevated wireless network node 104 is above a majority of the metal portions of the vehicle 100.

In the illustrated example, the plurality of external wireless network nodes 106 are used to track the location of the mobile device 114. In some examples, certain functions of the PAAK app 116 may be available based on where the mobile device 114 is located relative the vehicle 100. For example, the unlock function may be available when the mobile device 114 is approaching from the driver's side door of the vehicle 100. In some examples, the plurality of external wireless network nodes 106 use a personal area network protocol (e.g., Bluetooth®, Zigbee®, etc.). In some such examples, the external wireless network nodes 106 are BLE nodes. Examples of tracking to the location of the mobile device 114 with the external wireless network nodes 106 are described in U.S. patent application Ser. No. 15/080,132, entitled "Driver Identification Using Vehicle Approach Vectors," which is incorporated herein by reference in its entirety.

The internal wireless node(s) 108, in conjunction with the external wireless network nodes 106, is/are used to determine whether the mobile device 114 is inside the vehicle 100. In some examples, some functions of the PAAK app 116 may be available when the mobile device 114 is located inside the vehicle 100. For example, the PAAK app 116 may be used to start the engine of the vehicle 100 when the mobile device 114 is inside the vehicle 100. In some examples, the internal wireless node(s) 108 use a personal area network protocol (e.g., Bluetooth®, Zigbee®, etc.). In some such examples, the internal wireless node(s) 108 is/are BLE nodes.

The body control unit 110 controls various subsystems of the vehicle 100. For example, the body control unit 110 may control power windows, power locks, an immobilizer system, and/or power mirrors, etc. The body control unit 110 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. The body control unit 110 is communicatively coupled to input controls within the vehicle 100, such as power window control buttons, power lock buttons, etc. The body control unit 110 instructs the subsystem to act based on the corresponding to the actuated input control. For example, if the driver's side window button is toggled to lower the driver's side window, the body control unit 110 instructs the actuator controlling the position of the driver's side window to lower the window. Additionally, the body control unit 110 is communicatively coupled to the PAAK unit 112. The body control unit 110 controls the subsystem in response to instructions from the PAAK unit 112.

The PAAK unit 112 (sometimes referred to herein as a "key phone unit") facilitates the PAAK app 116 executing on the mobile device 114 controlling functions of the vehicle 100 as if it were a key fob. The PAAK unit 112 is communicatively coupled to the elevated wireless network node 104, the external wireless network nodes 106, and the internal wireless node(s) 108. From time to time, the PAAK unit 112, via the elevated wireless network node 104 sends out a broadcast (sometimes referred to as "polling") to determine whether there are any paired mobile devices 114 in the vicinity of the vehicle 100. The PAAK unit 112 connects to the paired mobile device 114 that receives the broadcast via the elevated wireless network node 104. The PAAK unit 112 and the mobile device 114 establish the connection in accordance with the particular wireless network protocol. The PAAK unit 112 receives commands from the PAAK app 116 to forward to the body control unit 110.

Via the established connection, PAAK unit 112 interrogates the mobile device 114 to determine whether the PAAK app 116 executing on the mobile device 114 is authorized to access the vehicle 100. In some examples, the PAAK unit 112 and the PAAK app 116 exchange one or more authorization tokens. Additionally, in some examples, the PAAK app 116 may prompt a user for a password and/or a biometric input, such as a fingerprint, as part of generating the authorization token to send to the PAAK unit 112. For example, the authorization token generated by the PAAK app 116 may be based on the authorization token received from the PAAK unit 112, a unique numeric value stored by the PAAK app 116, and a numeric value (e.g., a hash value, etc.) based on the password and/or the biometric input. Once authorized, the PAAK unit 112 accepts key fob commands (e.g., unlock the door(s), open the trunk, arm and disarm an alarm, etc.), via the connection, from the PAAK app 116 executing on the paired mobile device 114.

The PAAK unit 112 interfaces with a passive-entry-passive-state (PEPS) system. The PEPS system (a) unlocks a door when a hand of a person is detected (e.g., via a touch sensor, via an infrared sensor, etc.) on or proximate the handle of the door, and/or (b) disengages the immobilizer and starts the engine without a key in an ignition (e.g., by pressing a ignition button, etc.) when an authorized device (e.g., the mobile device 114 executing the PAAK app 116) is present. The PAAK unit 112 determines, via the elevated wireless network node 104, whether the mobile device 114 is approaching the vehicle 100. In some examples, the PAAK unit 112 uses changes in the received signal strength indication (RSSI) and/or received transmission strength (RX) between the elevated wireless network node 104 and the mobile device 114 to determine whether the mobile device 114 is approaching the vehicle 100. In some examples, the external wireless network nodes 106 are normally in a low power mode. In such examples, the PAAK unit 112 instructs the external wireless network nodes 106 to wake up (e.g., enter a normal power mode) after determining that the mobile device 114 is approaching the vehicle 100. Additionally, in some examples, the internal wireless network nodes 108 are normally in a low power mode. In such examples, the PAAK unit 112 instructs the internal wireless network nodes 108 to enter a normal power mode after determining that the mobile device 114 is proximate a door of the vehicle 100.

The PAAK unit 112, via the external wireless network nodes 106, tracks the location of the mobile device 114 relative to the vehicle 100. The PAAK unit 112 enables the PEPS functions of the PAAK app 116 executing on the mobile device 114 based on the location of the mobile device. For example, the PAAK unit 112 may enable the automatic door unlock function of the PEPS system when mobile device is proximate the corresponding door. Additionally, the PAAK unit 112 determines, via the internal wireless network node(s) 106, when the mobile device 114 is inside the vehicle 100 to enable access to some of the PEPS system. For example, when the PAAK unit 112 detects that the vehicle is inside the vehicle 100, the PAAK unit 112 may enable the push-button ignition of the PEPS system.

Figure 2:
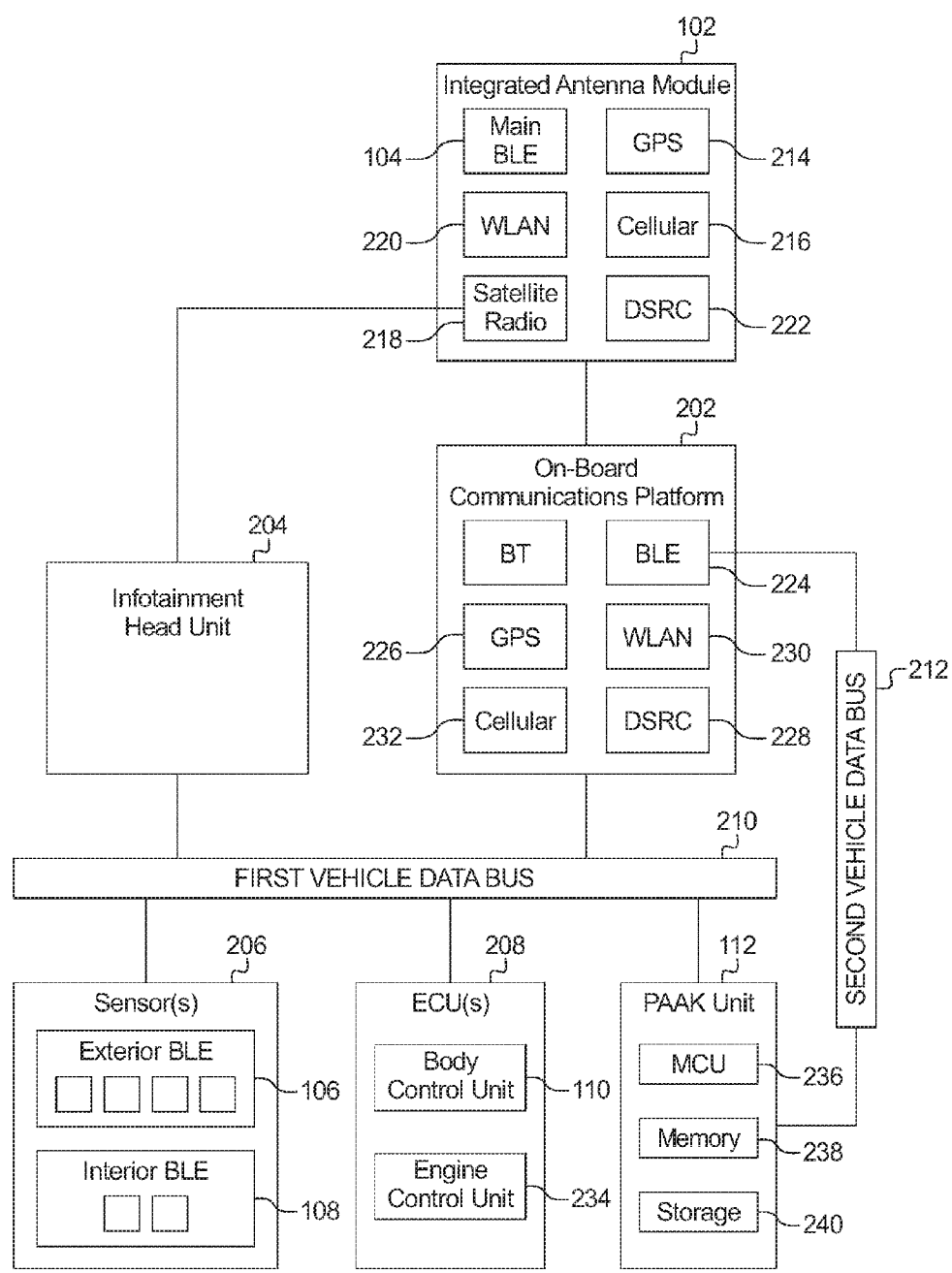
FIG. 2 illustrates electronic components of the vehicle of FIG. 1.

FIG. 2 depicts electronic components 200 to implement the vehicle 100 and the PAAK unit 112 of FIG. 1. In the illustrated example, the electronic components 200 includes the integrated antenna module 102, an on-board communications platform 202, an infotainment head unit 204, sensors 206, electronic control unit 208, the PAAK unit 112, a first vehicle data bus 210, and a second vehicle data bus 212.

The integrated antenna module 102 includes antennas to facilitate communication with external networks. In the illustrated example, the integrated antenna module 102 includes the elevated wireless network node 104, a GPS antenna 214, a cellular antenna 216, a satellite radio antenna 218, a wireless local area network (WLAN) antenna 220, and an antenna 222 for dedicated short range communication (DSRC).

The on-board communications platform 202 includes wired or wireless network interfaces to enable communication with the external networks. The on-board communications platform 202 also includes hardware (e.g., processors, memory, storage, etc.) and software to control the wired or wireless network interfaces. In the illustrated example, the on-board communications platform 202 includes a BLE module 224 electrically coupled to the elevated wireless network node 104, a GPS receiver 226 electrically coupled to the GPS antenna 214, a DSRC module 228 electrically coupled to the DSRC antenna 222, a WLAN module 230 electrically coupled to the WLAN antenna 220, and a cellular modem 232 electrically coupled to the cellular antenna 216.

The cellular modem 232 includes controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN module 230 includes one or more controllers for wireless local area networks such as a Wi-FI® controller (including IEEE 802.11 a/b/g/n/ac or others), a Bluetooth® controller (based on the Bluetooth® Core Specification maintained by the Bluetooth Special Interest Group), and/or a ZigBee® controller (IEEE 802.15.4), and/or a Near Field Communication (NFC) controller, etc. Further, the external network(s) may be a public network, such as the Internet; a private network, such as an intranet; or combinations thereof, and may utilize a variety of networking protocols now available or later developed including, but not limited to, TCP/IP-based networking protocols. The on-board communications platform 202 may also include a wired or wireless interface to enable direct communication with an electronic device (such as, a smart phone, a tablet computer, a laptop, etc.). The example DSRC module 228 includes radio(s) and software to broadcast messages and to establish direct connections between vehicles. DSRC is a wireless communication protocol or system, mainly meant for transportation, operating in a 5.9 GHz spectrum band.

The infotainment head unit 204 provides an interface between the vehicle 100 and users (e.g., drivers, passengers, etc.). The infotainment head unit 204 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers. The mobile device 114 may be paired with the BLE module 224 through a setup function accessed via the infotainment head unit 204. After being paired, the mobile device 114 and the BLE module 224 establish a connection when the BLE module 224 scans and a BLE module on the mobile device 114 is active. Through the connection, applications (e.g. the PAAK app 116, a podcatcher app, etc.) on the mobile device 114 may communicate with other system within the vehicle 100 (e.g., the audio system of the infotainment head unit, etc.).

The sensors 206 may be arranged in and around the vehicle 100 in any suitable fashion. In the illustrated example, the sensors 206 include the external wireless network nodes 106 and the internal wireless network nodes 108. The external wireless network nodes 106 are used to determine a location of the mobile device 114 relative to the vehicle 100. The external wireless network nodes 106 include hardware and firmware to operate as a personal area network node. The internal wireless network nodes 108 are used to detect when the mobile device 114 is include the vehicle 100. The internal wireless network nodes 108 include hardware and firmware to operate as a personal area network node.

The ECUs 208 monitor and control subsystems of the vehicle 100. The ECUs 208 communicate and exchange information via the first vehicle data bus 210. Additionally, the ECUs 208 may communicate properties (such as, status of the ECU 208, sensor readings, control state, error and diagnostic codes, etc.) to and/or receive requests from other ECUs 208. Some vehicles 100 may have seventy or more ECUs 208 located in various locations around the vehicle 100 communicatively coupled by the first vehicle data bus 210. The ECUs 208 are discrete sets of electronics that include their own circuit(s) (such as integrated circuits, microprocessors, memory, storage, etc.) and firmware, sensors, actuators, and/or mounting hardware. In the illustrated example, the ECUs 208 include the body control unit 110 and an engine control unit 234. The example body control unit 110 controls various subsystems of the vehicle 100. For example, the body control unit 110 may control power windows, power locks, power moon roof control, an immobilizer system, and/or power mirrors, etc. The engine control unit 234 controls subsystems related to engine performance, such as ignition, fuel injection, and spark plug timing, etc.

The PAAK unit 112 includes a processor or controller 236, memory 238, and storage 240. In some examples, the PAAK unit 112 may be incorporated into the body control unit 110. The processor or controller 236 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 238 may be volatile memory (e.g., RAM, which can include non-volatile RAM, magnetic RAM, ferroelectric RAM, and any other suitable forms), non-volatile memory (e.g., disk memory, FLASH memory, EPROMs, EEPROMs, memristor-based non-volatile solid-state memory, etc.), unalterable memory (e.g., EPROMs), and/or read-only memory. In some examples, the memory 238 includes multiple kinds of memory, particularly volatile memory and non-volatile memory. The storage 240 may include any high-capacity storage device, such as a hard drive, and/or a solid state drive.

The memory 238 and the storage 240 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 238, the computer readable medium, and/or within the processor 236 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The first vehicle data bus 210 includes one or more data buses that communicatively couple the on-board communications platform 202, the infotainment head unit 205, the sensors 206, the ECUs 208, the PAAK unit 112, and other devices connected to the first vehicle data bus 210. In some examples, the first vehicle data bus 210 is implemented in accordance with the controller area network (CAN) bus protocol as defined by International Standards Organization (ISO) 11898-1. Alternatively, in some examples, the first vehicle data bus 210 may be a Media Oriented Systems Transport (MOST) bus, or a CAN flexible data (CAN-FD) bus (ISO 11898-7). The second vehicle data bus 212 communicatively couples the BLE module 224 to the PAAK unit 112 and/or the body control unit 110. In the illustrated example, the second vehicle data bus 212 is in accordance with the K-Line protocol as defined by ISO 9141. In some examples, when the PAAK app 116 is authenticated by the PAAK unit 112 and/or the body control unit 110, the PAAK app 116, via a BLE connection established between the mobile device 114 and the BLE module 224, communicates with the PAAK unit 112 and/or the body control unit 110 via the second vehicle data bus 212.

Figure 3:
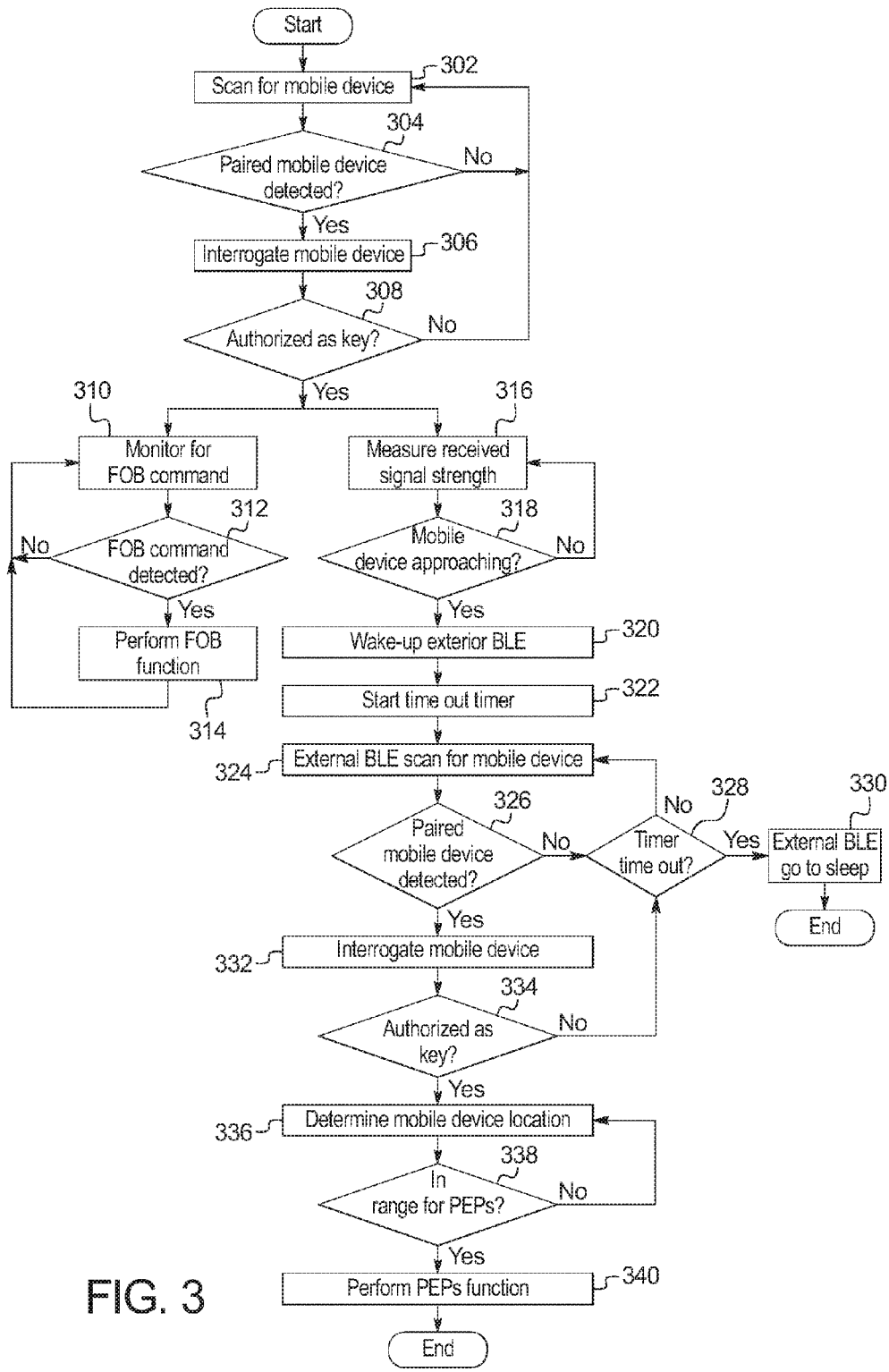
FIG. 3 is a flowchart of an example method to provide phone-as-a-key functions at an extended range that may be implemented by the electronic components of FIG. 2.

FIG. 3 is a flowchart of an example method to provide phone-as-a-key functions at an extended range that may be implemented by the electronic components 200 of FIG. 2. Initially, the BLE module 224, via the elevated wireless network node 104, scans for mobile devices (e.g., the mobile device 114 of FIG. 1) (block 302). The BLE module 224 determines whether the detected mobile device 114 is paired with the BLE module 224 (block 304). If the detected mobile device 114 is paired with the BLE module 224, the PAAK unit 112 interrogates (e.g., exchanges security tokens with) the mobile device 114 (block 306). The PAAK unit 112 determines whether the PAAK app 116 on the mobile device 114 is authorized to act as a key fob for the vehicle 100 (block 308).

If the PAAK unit 112 determines that the PAAK app 116 on the mobile device 114 is authorized to act as a key fob, the PAAK unit 112 monitors the connection between the BLE module 224 and the mobile device 114 for FOB commands (e.g., lock or unlock one or more doors, unlock the trunk or lift gate, arm an alarm, etc.) (block 310). The PAAK unit 112 waits until detecting a FOB command (block 312). In response to detecting a FOB command, the PAAK unit 112 performs the command (block 314). In some examples, the PAAK unit 112 instructs the body control unit 110 via the first vehicle data bus 210 to perform the command.

Additionally, if, at block 308, the PAAK unit 112 determines that the PAAK app 116 on the mobile device 114 is authorized to act as a key fob, the PAAK unit 112 receives the RSSI value and/or the RX value from the mobile device 114 (block 316). Based on the RSSI value and/or the RX value, the PAAK unit 112 determines whether the mobile device 114 is approaching the vehicle 100 (block 318). If the mobile device 114 is approaching the vehicle 100, the PAAK unit 112 instructs the external wireless network nodes 106 to go from a low power mode (e.g., sleep mode) to an operational power mode (e.g., active mode) (block 320). The PAAK unit 112 starts a time out timer (block 322). In some examples, the PAAK unit 112 uses the time out timer to determine if the mobile device 114 has left the vicinity of the vehicle 100. In some examples, the time out timer is thirty second.

The external wireless network nodes 106 scan for the mobile device 114 (block 324). The external wireless network nodes 106 determine whether they detect the paired mobile device 114 (block 326). If the external wireless network nodes 106 do not detect the paired mobile device, the PAAK unit 112 determines whether the time out timer has expired (block 328). If the time out timer has expired, the PAAK unit 112 instructs the external wireless network nodes 106 to enter sleep mode (block 330). Otherwise, if the time out timer has not expired, the PAAK unit 112 continues to scan for the mobile device 114 (block 324). If the external wireless network nodes 106 detect the paired mobile device 114, the PAAK unit 112 interrogates the mobile device 114 (block 332). The PAAK unit 112 determines whether the PAAK app 116 on the mobile device 114 is authorized to act as a key fob for the vehicle 100 (block 334). If the PAAK unit 112 determines that the PAAK app 116 on the mobile device 114 is not authorized to act as a key fob, the PAAK unit 112 determines whether the time out timer has expired (block 328).

Otherwise, if the PAAK unit 112 determines that the PAAK app 116 on the mobile device 114 is authorized to act as a key fob, the PAAK unit 112, via the external wireless network nodes 106, determines the location of the mobile device 114 (block 336). The PAAK unit 112 determines whether the mobile device is in range (e.g., proximate a door of the vehicle 100, inside the vehicle, etc.) for a PEPS function (e.g., push-button ignition start, automatic door unlock, etc.) (block 338). If the PAAK unit 112 determines that the mobile device is in range, the PAAK unit 112 instructs the body control unit 110 and/or the engine control unit 234 to perform the corresponding PEPS function (block 340).

The flowchart of FIG. 3 is representative of machine readable instructions that comprise one or more programs that, when executed by a processor (such as the processor 236 of FIG. 2), cause the vehicle 100 to implement the PAAK unit 112 ("the key phone unit") of FIGS. 1 and 2. Further, although the example program(s) is/are described with reference to the flowchart illustrated in FIG. 3, many other methods of implementing the example PAAK unit 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
  an integrated antenna array including a BLUETOOTH antenna communicatively connected to a first BLUETOOTH module;
  second BLUETOOTH modules initially in a sleep mode; and
  a phone-as-a-key unit communicatively connected to the first and second BLUETOOTH modules via a dedicated data bus and configured to:
    in response to detecting an authorized mobile device executing a phone-as-a-key application, wake the second BLUETOOTH modules; and
    perform functions requested by the mobile device.

2. The vehicle of claim 1, wherein the second BLUETOOTH modules are located around the vehicle and configured to detect a location of the authorized mobile device relative to the vehicle.

3. The vehicle of claim 1, wherein to wake the plurality of second BLUETOOTH modules, the phone-as-a-key unit is configured to instruct the second BLUETOOTH modules to enter a standard power mode from the sleep mode.

4. The vehicle of claim 1, wherein the phone-as-a-key unit is configured to determine when the mobile device is approaching the vehicle based on a received signal strength indicator received from the mobile device.

5. The vehicle of claim 1, wherein the second BLUETOOTH modules are configured to determine a location of the authorized mobile device relative to the vehicle, and wherein, in response to the authorized mobile device being proximate a door of the vehicle, the phone-as-a-key unit is configured to unlock the door.

6. The vehicle of claim 1, wherein the first BLUETOOTH module is configured to communicatively couple with a smart watch, and wherein the mobile device is the smart watch.

7. The vehicle of claim 1, wherein the phone-as-a-key unit is to, in response to detecting the mobile device executing the phone-as-a-key application:
  start a timer; and
  in response to the timer expiring and no longer detecting the mobile device executing the phone-as-a-key application, cause the second BLUETOOTH modules to enter the sleep mode.

8. The vehicle of claim 1, wherein the second BLUETOOTH modules are configured to determine a location of the authorized mobile device relative to the vehicle, and wherein, in response to the authorized mobile device being proximate a door of the vehicle, the phone-as-a-key unit is configured to instruct BLUETOOTH modules in the interior of the vehicle to enter a standard power mode from the sleep mode.

9. The vehicle of claim 8, wherein, in response to the third BLUETOOTH modules determining that the mobile device is inside the vehicle, the phone-as-a-key unit is configured to enable a push-button ignition system.

10. A method comprising:
  detecting, with a phone-as-a-key unit communicatively coupled to first and second BLUETOOTH modules via a dedicated data bus, a location of a mobile device executing a phone-as-a-key application via:
    an integrated antenna array on a roof of a vehicle that include a plurality of antenna for different communication protocols, the plurality of antenna including a BLUETOOTH antenna, the first BLUETOOTH module communicatively connected to the BLUETOOTH antenna, and
    the second BLUETOOTH modules that are initially in a sleep mode; and
  in response to the mobile device being authorized to communicate with the vehicle:
    waking the second BLUETOOTH modules, and
    performing key fob functions requested by the mobile device.

11. The method of claim 10, wherein waking the second BLUETOOTH modules includes instructing the second BLUETOOTH modules to enter a standard power mode from the sleep mode.

12. The method of claim 10, including determining when the mobile device is approaching the vehicle based on a received signal strength indicator received from the mobile device.

13. The method of claim 10, including:
  determining, via the second BLUETOOTH modules, the location of the mobile device relative to the vehicle; and
  in response to the mobile device being proximate a door of the vehicle, unlocking the door.

14. The method of claim 10, including:
  determining, via the second BLUETOOTH modules, the location of the mobile device relative to the vehicle; and
  in response to the mobile device being proximate a door of the vehicle, instructing third BLUETOOTH modules in the interior of the vehicle to enter a standard power mode from the sleep mode.

15. The method of claim 14, including, in response to the plurality of the third BLUETOOTH modules determining that the mobile device is inside the vehicle, enabling a push-button ignition system.

16. A tangible computer readable medium comprising instruction that, when executed, cause a vehicle to:
  detect with a phone-as-a-key unit communicatively coupled to first and second BLUETOOTH modules via a dedicated data bus, a location of a mobile device executing a phone-as-a-key application via:
    an integrated antenna array on a roof of the vehicle that include a plurality of antenna for different communication protocols, the plurality of antenna including a BLUETOOTH antenna, the first BLUETOOTH module communicatively connected to the BLUETOOTH antenna, and
    the second BLUETOOTH modules that are initially in a sleep mode; and
  in response to the mobile device being authorized to communicate with the vehicle:
    wake the second BLUETOOTH modules, and
    perform key fob functions requested by the mobile device.

* * * * *